(12) United States Patent
Gove

(10) Patent No.: US 7,539,851 B2
(45) Date of Patent: May 26, 2009

(54) USING REGISTER READINESS TO FACILITATE VALUE PREDICTION

(75) Inventor: Darryl J. Gove, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 32 days.

(21) Appl. No.: 11/437,478

(22) Filed: May 18, 2006

(65) Prior Publication Data

US 2007/0271444 A1 Nov. 22, 2007

(51) Int. Cl.
*G06F 9/00* (2006.01)
*G06F 9/45* (2006.01)
(52) U.S. Cl. .................. 712/220; 712/234; 717/151
(58) Field of Classification Search ................. 712/220
See application file for complete search history.

(56) References Cited

U.S. PATENT DOCUMENTS

| 5,129,065 | A | * | 7/1992 | Priem et al. ................. 712/203 |
| 5,260,898 | A | * | 11/1993 | Richardson ................. 708/490 |
| 5,365,500 | A | * | 11/1994 | Park ............................... 369/2 |
| 5,991,845 | A | * | 11/1999 | Bohannon et al. ........... 710/200 |
| 6,219,781 | B1 | * | 4/2001 | Arora ........................ 712/217 |
| 6,643,763 | B1 | * | 11/2003 | Starke et al. .................. 712/11 |
| 2005/0223194 | A1 | * | 10/2005 | Tremblay et al. ........... 712/214 |
| 2005/0223385 | A1 | * | 10/2005 | Braun et al. ................ 718/108 |
| 2006/0136919 | A1 | * | 6/2006 | Aingaran et al. ............ 718/100 |

* cited by examiner

*Primary Examiner*—Eddie P Chan
*Assistant Examiner*—William B Partridge
(74) *Attorney, Agent, or Firm*—Park, Vaughan & Fleming LLP; Anthony P. Jones

(57) ABSTRACT

One embodiment of the present invention provides a system for using register readiness to facilitate value prediction. The system starts by loading a previously computed result for a function to a destination register for the function from a lookup table. The system then checks the destination register for the function by using a Branch-Register-Not-Ready (BRNR) instruction to check the readiness of the destination register. If the destination register is ready, the system uses the previously computed result in the destination register as the result of the function. Loading the value from the lookup table in this way avoids unnecessarily calculating the result of the function when that result has previously been computed.

8 Claims, 6 Drawing Sheets

```
return_value function A(parameter a)
BEGIN
        return some_calculation_using(a)
END
```

FIG. 3A

```
return_value Function A (parameter a)
BEGIN
        Load previous_input_value from lookup table [using parameter a as key]
        BRNR to Default code
        Compare parameter a with previous_input_value from lookup table
        If not equal branch to Default code Load previously_computed_result from lookup table [using parameter a as
        key]
        BRNR to Default code Return previously_computed_result
END Default code:
        Store parameter a into lookup table [using parameter a as key]
        Store result of some_calculation_using(a) into lookup table [using parameter
        a as key]

Return result of some_calculation_using(a)
END
```

FIG. 3B return_value Function A (parameter a)
BEGIN
    Load previous_input_value from lookup table [using parameter a as key]
    BRNR to Default code
    Compare parameter a with previous_input_value from lookup table
    If not equal branch to Default code Wait for a corresponding predetermined greater than a latency of a return from L1 cache, L2 cache, or memory Load previously_computed_result from lookup table [using parameter a as key]

BRNR to Default code after predetermined delay to allow result to return from memory BRNR to "Wait"

Return previously_computed_result
END

Default code:
    Store parameter a into lookup table [using parameter a as key]
    Store result of some_calculation_using(a) into lookup table [using parameter a as key]

Return result of some_calculation_using(a)
END

FIG. 3C

USING REGISTER READINESS TO FACILITATE VALUE PREDICTION

BACKGROUND

1. Field of the Invention

The present invention relates to techniques for improving the performance of computer systems. More specifically, the present invention relates to a method and apparatus that tests a register-readiness condition to improve the performance of value prediction.

2. Related Art

In the competitive marketplace for microprocessors, processor designers are forced to produce generation after generation of processors that continually improve in performance. As they stretch performance limits, processor designers face significant hurdles in achieving additional performance gains. In many instances, simply using improved circuitry or better fabrication processes to wring more performance from a processor design is impractical. Consequently, designers have relied on many different techniques to extract the maximum processor performance.

One such technique to improve performance involves altering program code to support "value prediction." In a program that supports value prediction, the result of qualifying functions is stored (along with the inputs that lead to the result). When a call to the qualifying function is encountered, the program checks to see if a result was previously computed with the same input. If so, the program uses the previously computed result instead of re-executing the function. In this way, the program avoids re-computing a result for the function for the same input value.

Unfortunately, the usefulness of this type of value prediction is limited because the lookup for the previously computed result may take a significant amount of time. For example, if the lookup causes an L1 cache miss, the processor may have to wait for the previously computed result to return from L2 cache or main memory before the lookup completes. Because the latency of a return from L2 cache or main memory can be dozens or hundreds of cycles, the lookup can be quite time-consuming. Consequently, the use of this technique has been limited to only the largest of functions.

Hence, what is needed is a method and apparatus for performing value prediction without the above-described problems.

SUMMARY

One embodiment of the present invention provides a system for using register readiness to facilitate value prediction. The system starts by loading a previously computed result for a function to a destination register for the function from a lookup table. The system then checks the destination register for the function by using a Branch-Register-Not-Ready (BRNR) instruction to check the readiness of the destination register. If the destination register is ready, the system uses the previously computed result in the destination register as the result of the function. Loading the value from the lookup table in this way avoids unnecessarily calculating the result of the function when that result has previously been computed.

In a variation on this embodiment, if the destination register is not ready, the system calculates the result using the function.

In a variation on this embodiment, the system commences the calculation of the result using the function while loading the previously computed result for the function to the destination register from the lookup table. The system then checks the destination register by using a BRNR instruction to check the readiness of the destination register. If the destination register is not ready, the system continues to calculate the result using the function. On the other hand, if the destination register is ready, the system terminates the calculation of the result using the function and uses the previously computed result in the destination register as the result of the function.

In a further variation, the system checks the destination register by using at least one additional BRNR instruction to check the readiness of the destination register. If the destination register is not ready, the system continues to calculate the result using the function. Otherwise, if the destination register is ready, the system terminates the calculation of the result using the function and uses the previously computed result in the destination register as the result of the function.

In a variation of this embodiment, a destination register is ready when the previously computed result is loaded into the destination register before the BRNR instruction checks the readiness of the destination register.

In a variation of this embodiment, the system delays the check using the BRNR instruction for a predetermined time to allow the previously computed result sufficient time to load into the destination register.

In a variation of this embodiment, the lookup table includes entries which hold results previously computed by the processor and the inputs used to calculate the results, wherein each result is stored at a location in the lookup table corresponding to the function that generated the result.

BRIEF DESCRIPTION OF THE FIGURES

FIG. 3A presents a function in pseudo-code in accordance with an embodiment of the present invention.

FIG. 3B presents an augmented function in pseudo-code in accordance with an embodiment of the present invention.

FIG. 3C presents an augmented function in pseudo-code that checks the destination register more than once in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

The Branch-Register-Not-Ready Instruction

In one embodiment of the present invention, processor 400 (see FIG. 4) supports a branch-register-not-ready ("BRNR") instruction. The BRNR instruction takes the address of a processor register and a jump target as inputs. When executed, the BRNR instruction checks the status of the processor register, to determine if the contents of the register are "ready" for use by processor 400. The contents of a register are ready for use when the register contains a valid copy of the expected data value. If the contents are not ready, the BRNR instruction causes processor 400 to jump to the target. Otherwise, processor 400 executes the next instruction in the program code. In other words, the BRNR instruction allows a programmer or compiler to tell processor 400 to jump to another location in the program code if a register is not ready for use. Note that the BRNR instruction can be easily implemented by modifying the register renaming unit in a processor that supports out-of-order execution. Alternatively, the BRNR instruction can be implemented to test a "not-there" bit which indicates whether a corresponding register is subject to an unresolved data dependency.

The BRNR instruction has a latency of only a few cycles. Hence, the BRNR instruction provides a mechanism for very rapidly checking a register's readiness in order to make decisions on how to proceed in the program code.

In one embodiment of the present invention, processor 400 also supports a branch-register-ready ("BRR") instruction, which functions in much the same way as the BRNR instruction. The difference is that the BRR instruction branches when the register is "ready" (instead of "not ready" like the BRNR instruction.) Note that the embodiments in the following sections are described using the BRNR instruction, but embodiments are envisioned using the BRR instruction.

Compilation Process

Figure 1:
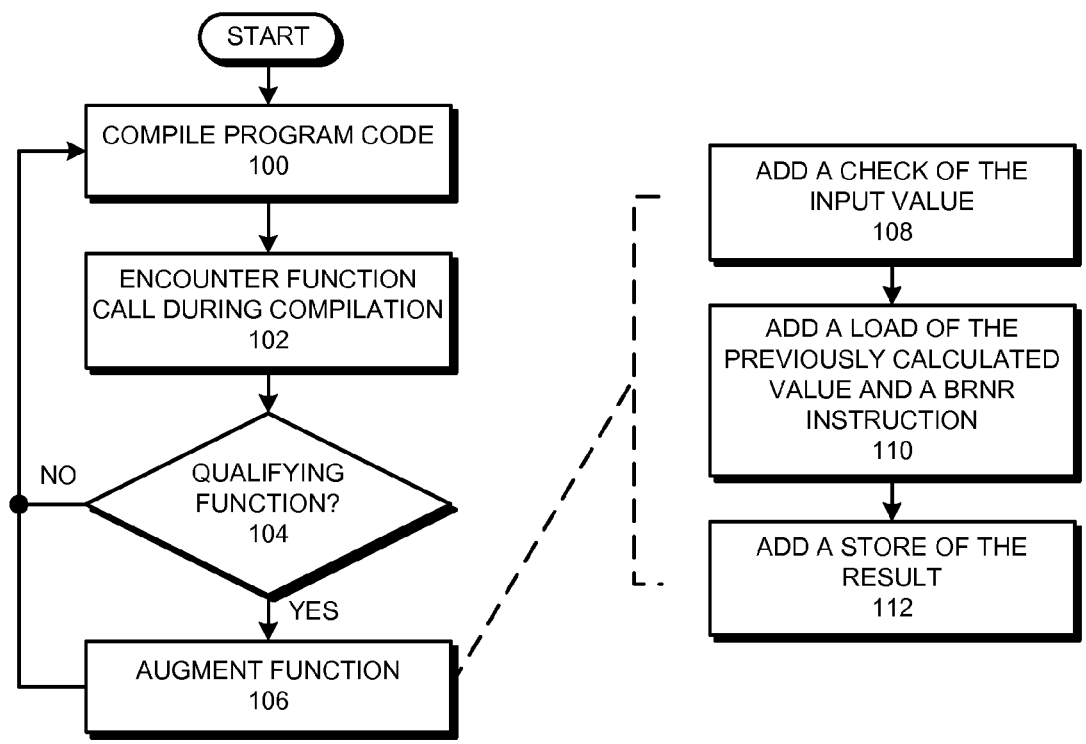
FIG. 1 presents a flowchart illustrating a compilation process in accordance with an embodiment of the present invention.

FIG. 1 presents a compilation process in accordance with an embodiment of the present invention. During the compilation process a compiler augments functions in the program code with a series of instructions designed to perform a "value prediction." When performing a value prediction, processor 400 (see FIG. 4) uses a previously computed result instead of computing the result of a function (where the inputs of the function correspond to the inputs which were used to compute the previous result). The use of the previously computed result eliminates the need to re-compute a result using the function, thereby reducing the amount of computational work required from processor 400.

The compilation process starts with a compiler compiling program code (step 100). When the compiler encounters a function (such as the function in FIG. 3A) (step 102), the compiler determines if the function is a "qualifying" function (step 104). A function qualifies if the function always returns the same output values given a particular set of input values. For example, functions such as "x=2*y" and "x=SQRT(y)" are qualifying functions. In addition, a qualifying function should be more than a few instructions long. Furthermore, an instruction does not qualify if the function has an effect outside the function itself (such as changing the value of a global variable). If the function does not qualify, the compiler returns to step 100 to continue compilation.

If the function qualifies, the compiler augments the function (see FIG. 3B) (step 106). While augmenting the function, the compiler adds instructions related to the performance of a value prediction. The compiler also adds a branch condition. The branch condition is triggered where the value prediction fails—either by failing a conditional test or by not executing quickly enough. In the event that the value prediction fails, the function branches to the "default code" tag. The code following the default code tag includes the original instructions for the function and a newly-added store operation.

The instructions that perform the value prediction include instructions for checking the input of the function and for loading the previously computed result. The compiler first adds instructions for checking the input of the function (step 108). When subsequently executed, these instructions attempt to load the previous input value from the corresponding location in lookup table 408 to a local destination register. The destination register is then checked using the BRNR instruction. If the destination register is ready, the current input value is checked to ensure an exact correspondence with the previous input value from lookup table 408, thereby avoiding the subsequent use of an incorrect previously computed result.

The compiler then adds instructions for loading the previously computed result (step 110). When subsequently executed, these instructions attempt to load the previously computed result from lookup table 408 to a local destination register. The destination register is then checked using the BRNR instruction. If the register is not ready, the code branches to the default code tag. Otherwise, the code returns the previously computed result, thereby completing the function.

The compiler next adds the instructions for storing the result following the default code tag (step 112). When subsequently executed, these instructions store the result generated from the execution of the original function into lookup table 408. Note that the only way to reach the default tag—and execute the original function and the store operation—is to fail the value prediction operation.

In one embodiment of the present invention, a predetermined delay is inserted between the load of the previously computed result and the BRNR instruction. This delay allows the result sufficient time to return from the location in lookup table 408 to register file 106. For example, if the result is expected to come from the L1 cache, the delay can be short. However, if the result is expected to come from the L2 cache, the delay should be long enough to permit the load to complete. If the delay is not long enough, the BRNR instruction can unnecessarily fail, eliminating the advantage gained using value prediction. Note that in place of delaying the BRNR instruction, one or more other instructions may be executed between the load and the BRNR instruction.

In one embodiment of the present invention, the instructions in the original function are not separated from the instructions for the value prediction. Rather, the instructions for the original function are intermixed with the instructions for the value prediction. In this embodiment, the execution of the instructions from the function alternates with the execution of the instructions for the value prediction. If the previously computed result is eventually loaded successfully, the BRR instruction branches to instructions that return the previously computed result, thereby completing the function. Otherwise, the original function completes and returns the computed result.

In an alternative embodiment, the intermixed instructions include more than one BRR instruction. Using more than one BRR instruction facilitates checking the destination register more than once during the execution of the original function. For example, a first BRR instruction can be executed when the previously computed result has had time to return from L1 cache and a second BRR instruction can be executed when the previously computed result has had time to return from L2 cache. In this way, a long running function can start while the value prediction is attempted.

Checking Process

Figure 2A:
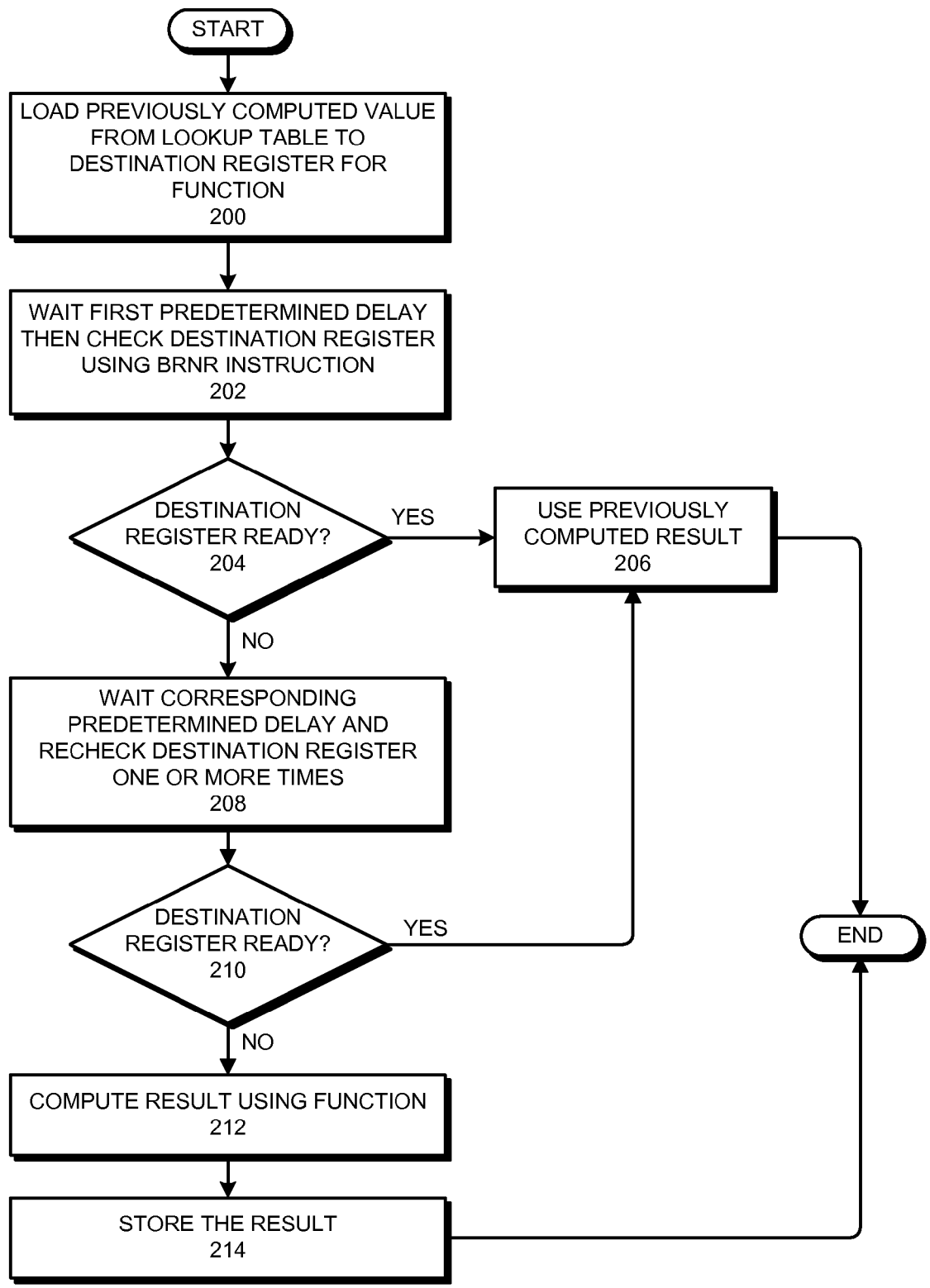
FIG. 2 presents a flowchart illustrating a value prediction process using a BRNR instruction in accordance with an embodiment of the present invention.

FIG. 2A presents a flowchart illustrating a value prediction process using a BRNR instruction in accordance with an embodiment of the present invention. The process starts when processor 400 (see FIG. 3) executes a function that includes a value prediction. Processor 400 first attempts to load a previously computed result for the function from lookup table 408 to the destination register for the function (step 200). Note that loading the previously computed result to the destination register may include verification steps to assure that the previously computed result is correct.

Processor 400 next executes a BRNR instruction on the destination register (step 202). The BRNR instruction checks the readiness of the register (step 204). If the previously computed result has successfully loaded from lookup table 408, the destination register is ready. Hence, processor 400 does not compute a result using the function, but instead skips the function and uses the previously computed result (step 208).

If the previously computed result has not successfully loaded from lookup table 408, the destination register is not ready. Processor 400 then rechecks the destination register one or more times (step 208). During each recheck, processor 400 uses a BRNR instruction to determine if the destination register is ready. Note that performing each recheck can involve waiting for a corresponding delay before using the BRNR instruction to determine if the destination register is ready.

If any of the BRNR instruction(s) indicate that the destination register is ready (step 210), the processor uses the previously computed result (step 206). Otherwise, if the destination register remains not ready (step 210), processor 400 computes the result using the function (step 212) and stores the result to lookup table 408 for subsequent function calls (step 214).

Figure 2B:
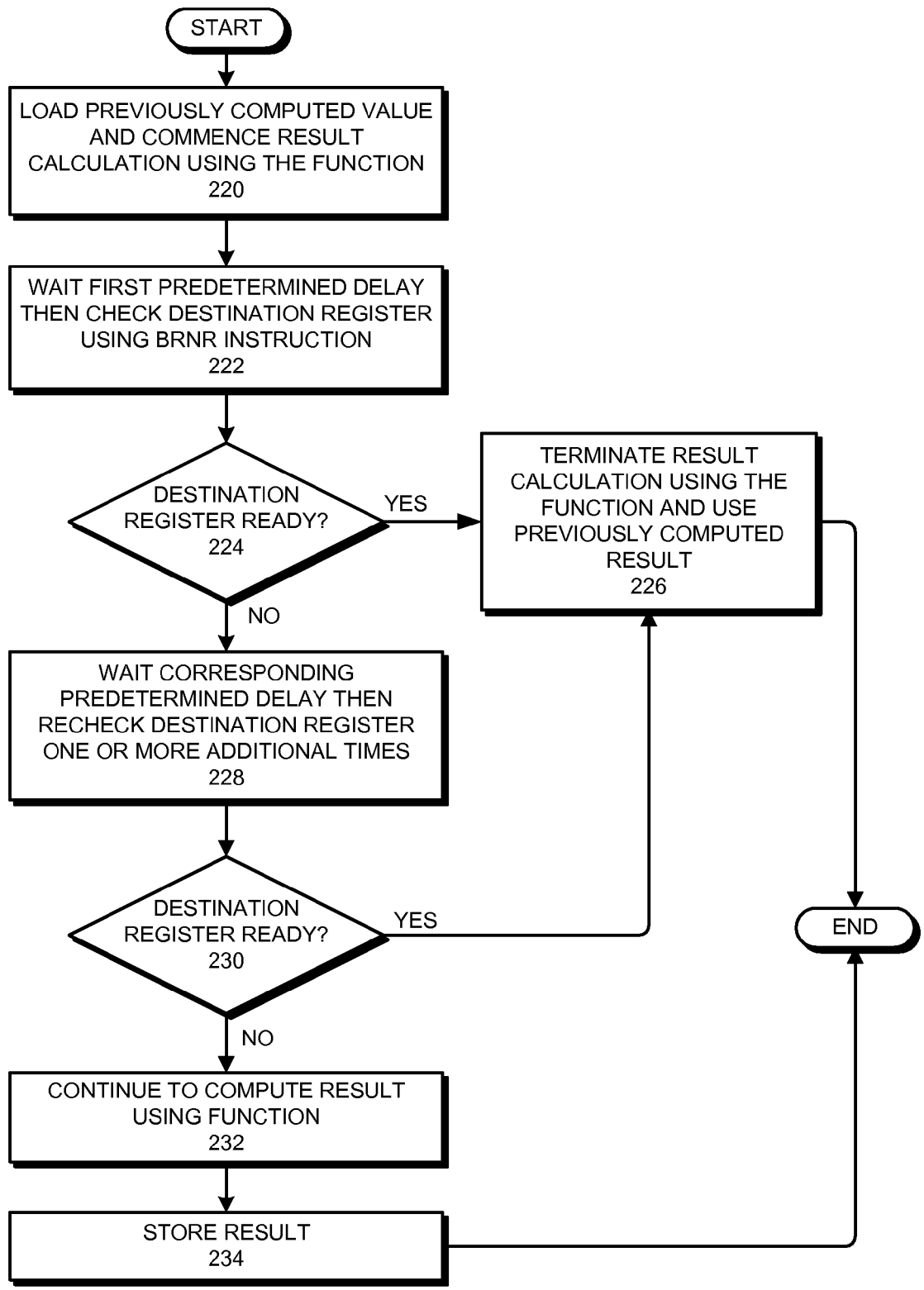

FIG. 2B presents a flowchart illustrating a value prediction process using a BRNR instruction in accordance with embodiments of the present invention. The process starts when processor 400 executes a function that includes a value prediction. Processor 400 first attempts to load a previously computed result for the function from lookup table 408 to the destination register for the function while commencing the calculation of the result using the function (step 220).

Processor 400 next executes a BRNR instruction on the destination register to check the readiness of the register (step 222). If the previously computed result has successfully loaded from lookup table 408, the destination register is ready (step 224). Hence, processor 400 terminates the calculation of the function and uses the previously computed result (step 226).

If the previously computed result has not successfully loaded from lookup table 408, the destination register is not ready (step 224). Processor 400 then rechecks the destination register one or more times (step 228). During each recheck, processor 400 uses a BRNR instruction to determine if the destination register is ready. Note that performing each recheck can involve waiting for a corresponding delay before using the BRNR instruction to determine if the destination register is ready.

If any of the BRNR instruction(s) indicate that the destination register is ready (step 230), processor 400 terminates the calculation of the function and uses the previously computed result (step 226). Otherwise, if the destination register remains not ready (step 230), processor 400 continues to compute the result using the function (step 232) and stores the result to lookup table 408 for subsequent function calls (step 234).

System

Figure 4:
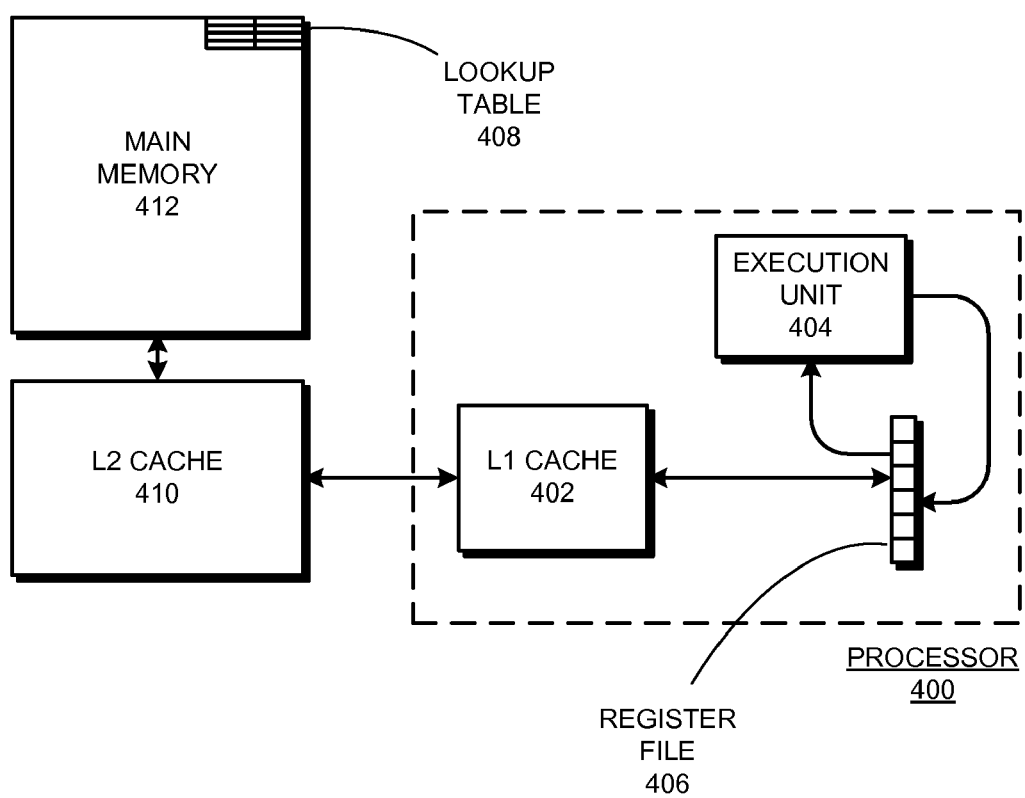
FIG. 4 illustrates a processor that supports value prediction in accordance with an embodiment of the present invention.

FIG. 4 illustrates a processor that supports value prediction in accordance with an embodiment of the present invention. Processor 400 in FIG. 4 includes execution unit 404, register file 406, and L1 cache 402. Processor 400 also uses external L2 cache 410 and main memory 412. Main memory 412 includes lookup table 408.

In one embodiment of the present invention, lookup table 408 is a hash table or an associative array in memory in which a set of "keys" corresponds to a set of "values." Each key in lookup table 408 is a pattern representing a function (including the input parameters), while each value includes both a field for the result from the execution of the function and a field for the input parameters used to generate the result. For example, a key-value pair in lookup table 408 could include a key generated from a function such as "SQRT(4)," with a corresponding value of "4, 2."

One embodiment of the present invention employs a key-generation instruction which causes the processor to convert the function call (along with the function call's input parameters) into an index in lookup table 408.

Note that portions of lookup table 408 can exist in the L2 cache 410 and L1 cache 402 addition to main memory 412. The portion of lookup table 408 in L1 cache 402 or L2 cache 410 is considerably smaller than the entire lookup table 408 in main memory.

During operation, execution unit 404 executes program code, including augmented functions (for an example of an augmented function see FIG. 3B). When executed, an augmented function attempts to perform a value prediction.

In one embodiment of the present invention while performing a value prediction execution unit 404 executes a load instruction to load the inputs used to generate a previously computed result for the augmented from lookup table 408. After executing the load instruction, execution unit 404 executes a BRNR instruction to check the readiness of the destination register for the load. If the destination register is ready, execution unit 404 compares the current inputs to the inputs used to generate the previously computed result. If the inputs correspond, execution unit 404 proceeds with the value prediction. Otherwise (if the inputs do not correspond) the value prediction has failed and execution unit 404 computes a result for the function. Note that the load-and-check is necessary in this embodiment because lookup table 408 is a hash-table structure, which involves a many-into-one indexing scheme that allows more than one generating function to write a result to a particular location in lookup table 408. In other words, the inputs are checked to insure that the inputs that were used to create the result in the location in lookup table 408 correspond to the current inputs to the augmented function or there is a risk of using an incorrect result value.

Execution unit 404 then executes a load instruction to load a previously computed result for the augmented function from lookup table 408 to a destination register for the function in register file 406. After executing the load instruction, execution unit 404 executes a BRNR instruction to check the readiness of the destination register. If the result has not successfully loaded, the value prediction has failed and execution unit 404 computes the result for the function. The computed result is then stored (along with the function's inputs) in the corresponding field in lookup table 408 for lookup by a subsequent function call. Otherwise, if the result has successfully loaded, execution unit 404 uses the result in the destination register instead of re-computing the result, thereby completing the augmented function.

Extensions

In an alternative embodiment, the value prediction does not rely on a BRNR instruction, but instead includes a branch target with the instruction that generates the key for lookup table 408. If processor 100 determines that the previously computed result was successfully loaded from lookup table 408 (i.e.: the value prediction was successful), processor 100 jumps to the branch target. Alternatively, if the load was unsuccessful, processor 100 continues with the execution of the function.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using register readiness to facilitate value prediction, comprising:
   loading a previously computed result for a function to a destination register for the function from a lookup table, wherein some or all of the lookup table is stored in an L1 cache, an L2 cache, and a memory that are separate from a register file where the destination register is located;
   waiting for a first predetermined delay and then using a Branch-Register-Not-Ready (BRNR) instruction to check the readiness of the destination register, wherein the first predetermined delay is proportional to a latency of a return of data from the L1 cache; and
   if the destination register is not ready, rechecking the destination register one or more times, wherein each recheck of the destination register involves waiting for a predetermined delay corresponding to each recheck and then checking the readiness of the destination register by using a BRNR instruction, wherein a predetermined delay for a first recheck is proportional to a latency of a return of data from the L2 cache and wherein a predetermined delay for a second recheck is proportional to a latency of a return of data from the memory;
   if the destination register remains not ready, using the function to calculate a result for the function; otherwise
   if any BRNR instruction indicates that the destination register is ready, using the previously computed result in the destination register as the result of the function.

2. The method of claim 1, further comprising commencing the calculation of the result using the function while loading the previously computed result for the function to the destination register from the lookup table;
   wherein using the function to calculate a result for the function involves continuing to calculate the result using the function; and
   wherein using the previously computed result in the destination register involves terminating the calculation of the result using the function.

3. The method of claim 1, wherein a destination register is ready when the previously computed result is loaded into the destination register before the BRNR instruction checks the readiness of the destination register.

4. The method of claim 1, wherein the lookup table includes entries which hold results previously computed by the processor and the inputs used to calculate the results, wherein each result is stored at a location in the lookup table corresponding to the function that generated the result.

5. An apparatus for using register readiness to facilitate value prediction, comprising:
   a processor;
   a memory system, including an L1 cache on the processor, an L2 cache coupled to the processor and a main memory coupled to the L2 cache;
   an execution mechanism on the processor;
   wherein the execution mechanism is configured to load a previously computed result for a function to a destination register for the function from a lookup table, wherein the destination register is in a register file on the processor and some or all of the lookup table is stored separately in the L1 cache, the L2 cache, and the memory;
   wherein the execution mechanism is configured to wait for a first predetermined delay and then check the destination register for the function by using a BRNR instruction to check the readiness of the destination register, wherein the first predetermined delay is proportional to a latency of a return of data from the L1 cache; and
   if the destination register is not ready, the execution mechanism is configured to recheck the destination register one or more times, wherein during each recheck, the execution mechanism is configured to wait for a predetermined delay corresponding to each recheck and then check the readiness of the destination register by using a BRNR instruction, wherein a predetermined delay for a first recheck is proportional to a latency of a return of data from the L2 cache and wherein a predetermined delay for a second recheck is proportional to a latency of a return of data from the memory;
   if the destination register remains not ready, the execution mechanism is configured to use the function to calculate a result for the function; otherwise
   if any BRNR instruction indicates that the destination register is ready, the execution mechanism is configured to use the previously computed result in the destination register as the result of the function.

6. The apparatus of claim 5, wherein while loading the previously computed result for the function to the destination register from the lookup table, the execution mechanism is configured to commence the calculation of the result using the function;
   wherein when using the function to calculate a result for the function, the execution mechanism is configured to continue to calculate the result using the function; and
   wherein when using the previously computed result in the destination register, the execution mechanism is configured to terminate the calculation of the result using the function.

7. A computer-readable storage medium storing instructions that when executed by a computer cause the computer to perform a method for using register readiness to facilitate value prediction, the method comprising:
   loading a previously computed result for a function to a destination register for the function from a lookup table, wherein some or all of the lookup table is stored in an L1 cache, an L2 cache, or a memory that are separate from a register file where the destination register is located;
   waiting for a first predetermined delay and then using a BRNR instruction to check the readiness of the destination register, wherein the first predetermined delay is proportional to a latency of a return of data from the L1 cache; and if the destination register is not ready, rechecking the destination register one or more times, wherein each recheck of the destination register involves waiting for a predetermined delay corresponding to each recheck and then checking the readiness of the destination register by using a BRNR instruction, wherein a predetermined delay for a first recheck is proportional to a latency of a return of data from the L2 cache and wherein a predetermined delay for a second recheck is proportional to a latency of a return of data from the memory;

if the destination register remains not ready, using the function to calculate a result for the function; otherwise if any BRNR instruction indicates that the destination register is ready, using the previously computed result in the destination register as the result of the function.

8. The computer-readable storage medium of claim 7, wherein the method further comprises commencing the calculation of the result using the function while loading the previously computed result for the function to the destination register from the lookup table;

wherein using the function to calculate a result for the function involves continuing to calculate the result using the function; and wherein using the previously computed result in the destination register involves terminating the calculation of the result using the function.

* * * * *